United States Patent
Degeneve et al.

(10) Patent No.: US 11,048,806 B2
(45) Date of Patent: Jun. 29, 2021

(54) METHOD FOR CONTROLLING THE ACCESS TO A SECURE AREA OF AN EQUIPMENT, ASSOCIATED COMPUTER PROGRAM, COMPUTER MEDIUM AND EQUIPMENT

(71) Applicant: ALSTOM Transport Technologies, Saint-Ouen (FR)

(72) Inventors: Xavier Degeneve, Lyons (FR); Baptiste Fouques, Villeurbanne (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 338 days.

(21) Appl. No.: 16/170,073

(22) Filed: Oct. 25, 2018

(65) Prior Publication Data

US 2019/0130118 A1    May 2, 2019

(30) Foreign Application Priority Data

Oct. 27, 2017 (FR) ..................... 17 60159

(51) Int. Cl.
  *G06F 21/31* (2013.01)
  *H04L 9/32* (2006.01)
  (Continued)

(52) U.S. Cl.
  CPC ............ *G06F 21/602* (2013.01); *G06F 21/31* (2013.01); *G06F 21/34* (2013.01); *G06F 21/35* (2013.01);
  (Continued)

(58) Field of Classification Search
  CPC ...... G06F 21/602; G06F 21/31; G06F 21/572; G06F 21/34; G06F 21/35; G06F 21/6218;
  (Continued)

(56) References Cited

U.S. PATENT DOCUMENTS

| | | | |
|---|---|---|---|
| 2004/0006695 A1* | 1/2004 | Ishibashi | H04L 9/3263 713/175 |
| 2010/0186075 A1* | 7/2010 | Hohlbaum | G06F 21/34 726/7 |
| 2010/0287601 A1* | 11/2010 | Croize | G06F 21/6218 726/4 |

FOREIGN PATENT DOCUMENTS

| | | |
|---|---|---|
| FR | 2 916 068 A1 | 11/2008 |
| WO | 20090034018 A1 | 3/2009 |

OTHER PUBLICATIONS

FR Search Report, dated Jul. 2, 2018, from corresponding FR 1 760 159 application.

* cited by examiner

*Primary Examiner* — Nelson S. Giddins
(74) *Attorney, Agent, or Firm* — Nixon & Vanderhye

(57) ABSTRACT

Disclosed is a method for controlling access to a secure zone of an electronic equipment from a computer file, the equipment including a memory including a reference access right to the electronic equipment. The method includes: —acquiring a reference authenticator via the computer file; acquiring an authenticator from the user; authenticating the user by comparing the authenticator from the user with the reference authenticator; acquiring an access right via the computer file when, at the end of the authentication, the authenticator from the user is compliant with the reference authenticator; and opening an access session to the at least one corresponding secure zone, when the acquired access right corresponds to the reference access right in the memory.

15 Claims, 2 Drawing Sheets

(51) Int. Cl.
  *G06F 21/34* (2013.01)
  *G06F 21/60* (2013.01)
  *G06F 21/62* (2013.01)
  *G06F 21/57* (2013.01)
  *G06F 21/35* (2013.01)

(52) U.S. Cl.
  CPC ........ *G06F 21/572* (2013.01); *G06F 21/6218* (2013.01); *H04L 9/3247* (2013.01); *H04L 9/3265* (2013.01); *G06F 2221/2149* (2013.01)

(58) Field of Classification Search
  CPC ........... G06F 2221/2149; H04L 9/3247; H04L 9/3265
  See application file for complete search history.

METHOD FOR CONTROLLING THE ACCESS TO A SECURE AREA OF AN EQUIPMENT, ASSOCIATED COMPUTER PROGRAM, COMPUTER MEDIUM AND EQUIPMENT

This patent application claims the benefit of document FR 17/60159 filed on which is hereby incorporated by reference.

FIELD OF THE INVENTION

The present invention relates to a method for controlling access to a secure area of an electronic equipment.

BACKGROUND OF THE INVENTION

The invention also relates to an associated computer program and computer medium.

The invention further relates to an associated electronic equipment.

In the railroad field, it is known to equip pieces of electronic equipment, on board railway vehicles or installed on the ground along a railway line, with a user interface in particular making it possible to update or configure such equipment.

To prevent unauthorized users from taking control of such equipment, access control methods have been established. In particular, an access control method is known in which each piece of equipment comprises an identifier shared by several users and an authenticator, such as a password, associated with the shared identifier. To have access to a secure zone of the equipment, the user provides the equipment with the shared identifier and the associated authenticator.

However, such a method does not make it possible to adapt, and in particular to restrict, the access rights associated with a configuration for specific users. Furthermore, such a method is not suitable for giving temporary access rights to a user, which raises security problems. In order for a user to no longer be able to access the equipment, the identifier and the authenticator stored on the equipment should be changed, which is restrictive to implement.

Also known is an access control method in which the authentication data for authorized users is stored in a central server connected to the equipment. Any person wishing to connect to the equipment provides said equipment with his identifier and authenticator. The equipment then provides the central server with this data, then the central server returns an authorization or denial to access the equipment.

However, such a method requires a central server and is therefore not suitable for isolated equipment or equipment located in zones without a network, which is the case for the majority of railway equipment.

SUMMARY OF THE INVENTION

There is therefore a need for a method for controlling access to isolated equipment or equipment located in zones without a network that is adaptable and easy to implement while imparting a good security level.

To that end, the invention relates to a method for controlling access to a secure zone of a piece of electronic equipment from a computer file, the electronic equipment comprising a memory comprising at least one secure zone, the computer file being specific to a user and stored on a computer medium, the computer file comprising a reference authenticator and a right to access the electronic equipment for at least one corresponding secure zone, the memory comprising at least one reference access right to the electronic equipment, the method being carried out by the electronic equipment and comprising:

acquiring the reference authenticator via the computer file after connecting the computer medium to the electronic equipment, acquiring an authenticator from the user, authenticating the user by comparing the authenticator from the user with the reference authenticator, acquiring the access right via the computer file when, at the end of the authentication, the authenticator from the user is compliant with the reference authenticator, and opening an access session to said at least one corresponding secure zone, when the acquired access right corresponds to the reference access right in the memory.

According to other advantageous aspects of the invention, the access control method comprises one or several of the following features, considered alone or according to all technically possible combinations:

the computer file is signed with a signature key, the signature key being associated with a certificate from a certification authority, the certificate from the certification authority being stored in the memory, the method further comprising, before acquiring the access right, verifying the signature of the computer file with the certification of the certification authority stored in the memory.

the computer medium is a removable physical medium, such as a FLASH memory medium, for example a USB key.

the computer medium is a virtual medium, such as a computer file stored on a network server.

the computer file comprises a validity date, the electronic equipment comprising a clock, and wherein the opening of the access session further comprises comparing said validity date with a current date supplied by the clock, the session being able to be open only when the validity date is after said current date.

the computer file comprises at least one configuration aiming to modify the equipment, the method comprising executing the configuration on the electronic equipment after opening the session.

The invention also relates to a computer program comprising software instructions that, when executed by a computer, carry out an access control method as defined above.

The invention also relates to a computer medium such as a FLASH memory medium, configured to be connected to a piece of electronic equipment, the medium comprising a computer file specific to a user, the computer file comprising a reference authenticator and an access right to the electronic equipment for at least one corresponding secure zone of said equipment.

According to a specific embodiment, said equipment comprises a memory comprising at least one secure zone, the electronic equipment being configured to interact with the computer file, the memory comprising at least one reference access right to the electronic equipment, the equipment comprising:

a first module for acquiring a reference authenticator via the computer file after connecting the computer medium to the electronic equipment, a second module for acquiring an authenticator from the user, a module for authenticating the user by comparing the authenticator from the user with the reference authenticator, a third module for acquiring the access right via the computer file when the authentication module has authenticated the user, and a module for opening an access session to said at least one corresponding secure zone, when the acquired access right corresponds to the reference access right comprised in the memory.

The invention further relates to a piece of electronic equipment comprising a memory comprising at least one secure zone, the electronic equipment being configured to interact with a computer file, the computer file being specific to a user and stored on a computer medium, the computer file comprising a reference authenticator and an access right to the electronic equipment for at least one corresponding secure zone, the memory comprising at least one reference access right to the electronic equipment, the equipment comprising:

a first module for acquiring a reference authenticator via the computer file after connecting the computer medium to the electronic equipment, a second module for acquiring an authenticator from the user, a module for authenticating the user by comparing the authenticator from the user with the reference authenticator, a third module for acquiring the access right via the computer file when the authentication module has authenticated the user, and a module for opening an access session to said at least one corresponding secure zone, when the acquired access right corresponds to the reference access right comprised in the memory.

According to another advantageous aspect of the invention, the equipment as previously described is a piece of railway equipment configured to be placed on board a railway vehicle, such as a motor, a display system, an air conditioning system, a piece of network equipment, a piece of security equipment, a piece of signaling equipment or a piece of railway control equipment, or to be installed on the ground along a railway line, such as a light, a switch or a crossing.

BRIEF DESCRIPTION OF THE DRAWINGS

Other features and advantages of the invention will appear upon reading the following description, provided solely as a non-limiting example, and done in reference to the appended drawings, in which.

DETAILED DESCRIPTION OF THE PREFERRED EMBODIMENTS

Figure 1:
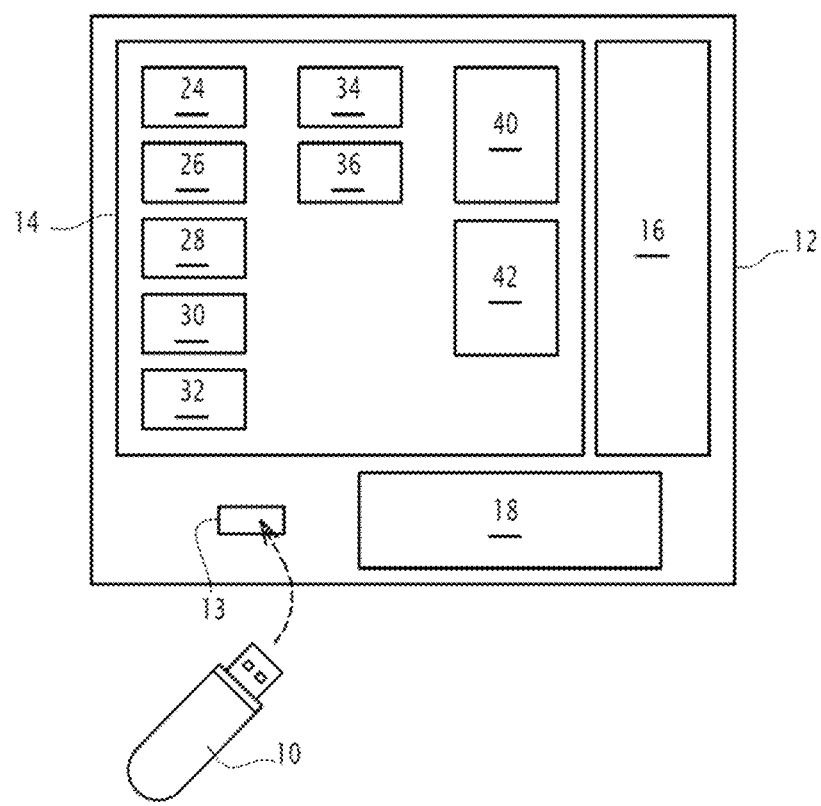
FIG. 1 is a schematic illustration of an electronic equipment and a medium according to the invention.

A computer medium 10 and a piece of electronic equipment 12 are illustrated in FIG. 1.

The computer medium 10 is configured to be connected to the piece of electronic equipment 12.

In the example illustrated in FIG. 1, the medium 10 is a removable physical medium. "Removable" means that such a medium is able to be separated from the electronic equipment 12. In the example of FIG. 1, the medium 10 is intended to be kept by a user of the electronic equipment 12. Preferably, the medium 10 is able to be transported effortlessly by such a user. Advantageously, the medium 10 weighs less than or equal to 500 grams (g), preferably less than or equal to 300 g, and still more preferably less than or equal to 100 g.

For example, the medium 10 is a FLASH memory medium, such as a USB key. Alternatively, the medium 10 is a floppy disk, an optical disk, a CD-ROM, a DVD, a magneto-optical disk, a ROM, a RAM, an EPROM, an EEPROM, a magnetic card or an optical card.

Alternatively, the medium 10 is a virtual medium. For example, the medium 10 is a computer file stored on a network server or any other computer or electronic member. In this case, the electronic equipment 12 interacts with said computer or electronic system. In another example, the medium 10 is an attachment attached to an email.

The medium 10 comprises a user-specific computer file. "Specific" means that the file contains information specific to just one given user. Any other user of the equipment 12 will then be assigned another computer file.

As an optional addition, the medium 10 comprises several user-specific computer files, optionally different from one another.

Preferably, the computer file is signed with a signature key, also called "private key". The validity verification of the signature of the file is then done with a key called "certificate of a certification authority", also called "public key", or a chain of certificates associated with a certification authority. Such a verification makes it possible to guarantee the integrity and authenticity of the data contained in the computer file. "Authenticity" means that the data come from an entity duly authorized to generate the computer file. "Integrity" means that the data itself are not altered or modified.

Advantageously, the data contained in the computer file are encrypted, and in particular when such data are confidential.

The computer file comprises a reference authenticator and at least one access right to the electronic equipment 12 for at least one corresponding secure zone of said equipment 12.

The access right is for example an authorization to open a session providing access to a secure zone of said equipment 12. Such an authorization is for example granted during a preset time. Such an authorization for example makes it possible to use data described in the computer file to change a configuration of the equipment 12.

In another example, the access right is shared by several pieces of equipment 12, or even different pieces of equipment 12. For example, the access right allows access to all of the air conditioning systems of a network of railway vehicles. Alternatively, the access right grants access to the air conditioning systems of only a given railway vehicle.

The reference authenticator is specific to the user intended to possess or have access to the medium 10.

The reference authenticator is for example a piece of secret knowledge, such as a password or a physical identification datum, in particular a biometric datum, such as a fingerprint image of the user or an image of the user's iris. Alternatively, the reference authenticator is a physical element in the user's possession, such as a physical token or a chip card.

Preferably, the computer file comprises a validity date, beyond which the data contained in the computer file have expired and are therefore no longer valid.

The electronic equipment 12 is an autonomous equipment. "Autonomous" means that the equipment 12 is not connected to a server, whether local or centralized, to operate.

Alternatively, the piece of electronic equipment 12 is a piece of equipment 12 connected to a computer network.

The equipment 12 is for example a piece of railway equipment configured to be placed on board a railway vehicle, such as a motor, a display system, an air conditioning system, a piece of network equipment, a piece of safety equipment, a piece of signaling equipment, a piece of railway control equipment, or to be installed on the ground along a railway line, such as a light, a switch or a crossing.

The equipment 12 comprises an input 13, a memory 14, a processor 16 and a man-machine interface 18. As an optional addition, when the computer file comprises a validity date, the piece of equipment 12 also comprises a clock, not shown, displaying a current date.

The equipment 12 also comprises different modules stored in the memory 14 of the equipment 12 and able to be executed by the processor 16 of the equipment 12. In particular, in the example illustrated in FIG. 1, the equipment 12 comprises a signature verification module 24, a first acquisition module 26, a second acquisition module 28, an authentication module 30, a third acquisition module 32, an opening module 34 and an execution module 36.

The input 13 is configured to be connected to the support 10 and to allow the extraction of data contained in the computer file of the medium 10.

For example, when the medium 10 is a USB key, the input 13 is a USB port. When the medium 10 is a CD or a DVD, the input 13 is a CD and/or DVD reader. When the medium 10 is an optical disk, the input 13 is an optical disk reader. When the medium 10 is a floppy disk, the input 13 is a floppy disk reader. When the medium 10 is a computer file stored on a network server, the input 13 is a network input, such as an Ethernet/IP, Wifi, Radiomobile, GSM, 3G or LTE input.

The memory 14 comprises a free access zone 40 and at least one secure zone 42. The free access zone 40 is accessible to any user of the equipment 12 without authentication or access authorization. The secure zone 42 is accessible only to authenticated data and/or to actions performed by approved users of the equipment 12, i.e., users who have been authenticated and who have been granted access to the equipment 12 using the access control method according to the invention.

The memory 14 further comprises at least one reference access right to the electronic equipment 12. The reference access right allows access to at least one secure zone 42 of the equipment 12.

Furthermore, when the computer file of the medium 10 is signed, the memory 14 comprises the certificate from the certification authority.

When the computer file of the medium 10 is encrypted, the memory 14 comprises a key to decrypt the computer file.

Alternatively, at least part of the memory 14 is in a server connected to the electronic equipment 12.

The man-machine interface 18 is for example a keyboard, a monitor, a mouse, a remote network interface (network terminal, web page) or a microphone.

The signature verification module 24 is able to verify the signature of the computer file with the certificate from the certification authority.

The first acquisition module 26 is able to acquire a reference authenticator via the computer file, following a connection of the equipment 12 to the computer file. The acquired reference authenticator is the reference authenticator stored in the computer file of the medium 10.

The second acquisition module 28 is able to acquire an authenticator entered by the user via the man-machine interface 18.

The authentication module 30 is able to authenticate the user by comparing the entered authenticator with the reference authenticator.

When the entered authenticator is valid in light of the reference authenticator, the user is authenticated. When the entered authenticator is not valid, the user is not authenticated.

The third acquisition module 32 is able to acquire an access right via the computer file, only when the authentication module 30 has authenticated the user.

As an optional addition, the third acquisition module 32 is able to acquire several or all of the access rights for the computer file when the authentication module 30 has authenticated the user.

Also as an optional addition, when the computer file comprises a validity date, the fourth acquisition module 33 is able to acquire the validity date of the computer file.

The opening module 34 is able to open an access session to said at least one corresponding secure zone 42, when the acquired access right corresponds to the reference access right in the memory 14 and, if applicable according to the aforementioned optional addition, when the acquired validity date is after the current date supplied by the clock of the equipment 12.

The access session is for example a session allowing access to the secure zone 42 for a preset duration. The access session is for example a session allowing the modification of the configuration of the equipment 12, for example the modification of software on board the equipment 12.

Preferably, when the computer file comprises at least one configuration aiming to modify the equipment 12, the execution module 36 is able to execute, after a session is opened by the opening module 34, at least one configuration seeking to modify the equipment 12.

The configurations are for example configurations aiming to update the equipment 12. Alternatively, the configurations are configurable behaviors of the equipment 12, such as network addresses, the identification of inputs and outputs, physical characteristics of the elements controlled by the equipment 12 and the execution of application modules.

Figure 2:
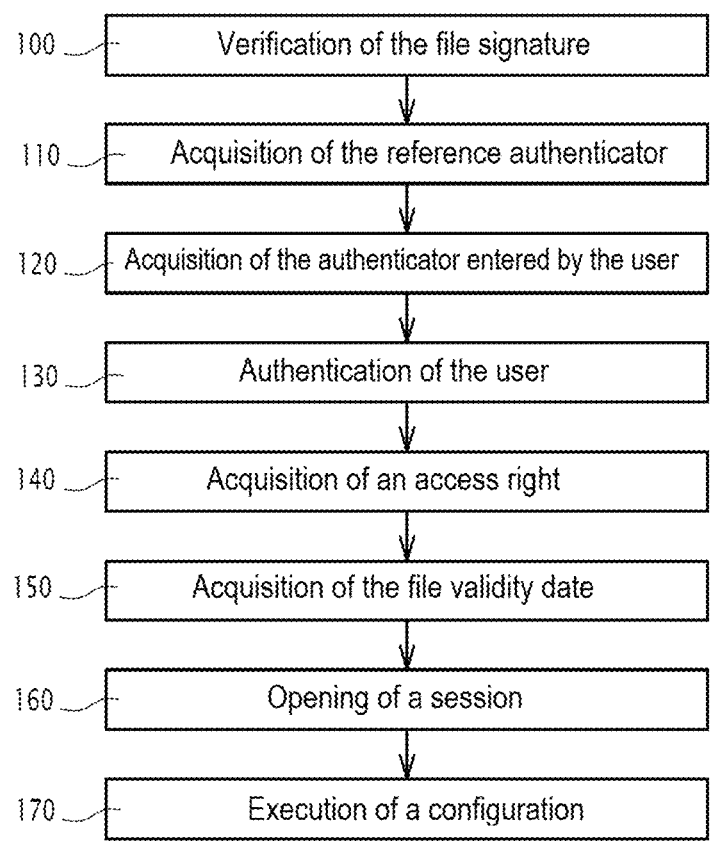
FIG. 2 is a flow chart of a control method implemented by the electronic equipment of FIG. 1.

An access control method will now be described in reference to FIG. 2. The access control method is carried out by the electronic control equipment 12 in interaction with the computer medium 10.

Initially, the electronic equipment 12 is connected to the computer file of the medium 10. When the medium 10 is a removable physical medium, such a connection is made by the user via the input 13. When the medium 10 is a virtual medium, such as a computer file stored on a network server or on any other computer or electronic system, the electronic equipment 12 connects to the medium 10, optionally via a wireless connection.

When the computer file of the medium 10 is signed, the control method comprises a step 100 for verification of the signature of the computer file by the signature verification module 24, using the certificate from the certification authority stored in the memory 14.

Then, during a step 110, the first acquisition module 26 acquires the reference authenticator from the computer file.

Next, during a step 120, the user enters or communicates an authenticator via the man-machine interface 18. The authenticator entered or provided by the user is then acquired by the second acquisition module 28.

During a following step 130, the authentication module 30 authenticates the user by comparing the entered authenticator with the reference authenticator. The user is authenticated only when the entered authenticator is valid in light of the reference authenticator.

Then, during a step 140, when the authentication module 30 has authenticated the user, the third acquisition module 32 acquires an access right from the computer file.

Furthermore, when the computer file comprises a validity date according to the aforementioned optional addition, the fourth acquisition module 33 acquires, during a step 150, the validity date of the computer file.

During a following step 160, the opening module 34 opens a session to access said at least one corresponding secure zone 42, when the acquired access right corresponds to the reference access right in the memory 14 and, if applicable, when the acquired access right corresponds to the reference access right in the memory 14 and, if applicable, when the acquired validity date is after the current date supplied by the clock of the equipment 12.

When the computer file comprises at least one configuration aiming to modify the equipment 12, the execution module 36 executes, during a following step 170, at least one configuration aiming to modify the equipment 12.

Thus, the control method according to the invention allows a user to access a piece of equipment 12 securely. Indeed, the medium 10 being specific to a given user, if a third party takes possession of the medium 10, said third party will not be able to use it unless he knows the user's authenticator. Furthermore, this also allows the physical user to be identified unambiguously. Furthermore, the file can be made obsolete by adding a validity date to the file, which solves the problem of temporary users.

The control method does not require centralized networks to operate. Such a method is therefore usable for isolated pieces of equipment 12 or for equipment located in zones without a network.

Thus, such a control method allows access to isolated equipment or equipment located in zones without a network while remaining adaptable and easy to implement and imparting a good level of security.

The invention claimed is:

1. A method for controlling access to a secure zone of a piece of electronic equipment from a computer file, the electronic equipment equipped with a memory comprising at least one secure zone, the computer file being specific to a user and stored on a computer medium, the computer file comprising a reference authenticator and a right to access the electronic equipment for at least one corresponding secure zone, and the memory comprising at least one reference access right to the electronic equipment,
   the method being carried out by the electronic equipment and comprising:
   acquiring the reference authenticator via the computer file after connecting the computer medium to the electronic equipment;
   acquiring an authenticator from the user;
   authenticating the user by comparing the authenticator from the user with the reference authenticator;
   acquiring the access right via the computer file when, at the end of the authentication, the authenticator from the user is compliant with the reference authenticator; and
   opening an access session to said at least one corresponding secure zone, when the acquired access right corresponds to the reference access right in the memory.

2. The method according to claim 1,
   wherein the computer file is signed with a signature key, the signature key being associated with a certificate from a certification authority, the certificate from the certification authority linked to the signature key being stored in the memory, and
   wherein the method further comprises, before acquiring the access right, verifying the signature of the computer file with the certification of the certification authority stored in the memory.

3. The method according to claim 1, wherein the computer medium is a removable physical medium.

4. The method according to claim 3, wherein the removable physical medium is a FLASH memory medium.

5. The method according to claim 4, wherein the FLASH memory medium is a USB key.

6. The method according to claim 1, wherein the computer medium is a virtual medium.

7. The method according to claim 6, wherein the virtual medium is a computer file stored on a network server.

8. The method according to claim 1,
   wherein the computer file comprises a validity date, the electronic equipment comprising a clock, and
   wherein the opening of the access session further comprises comparing said validity date with a current date supplied by the clock, the session being open only when the validity date is after said current date.

9. The method according to claim 1,
   wherein the computer file comprises at least one configuration aiming to modify the equipment, and
   wherein the method further comprises executing the configuration on the electronic equipment after opening the session.

10. A computer program recorded on a non-transitory computer-readable recording medium, the computer program comprised of software instructions executable by a processor of a computer that, upon execution by the processor, causes the computer to carry out the method according to claim 1.

11. A non-transitory computer-readable data storage medium configured to be connected to an electronic equipment, the medium having a computer file recorded thereon that is specific to a user, the computer file comprising a reference authenticator and an access right to the electronic equipment for at least one corresponding secure zone of said equipment, said equipment being equipped with a processor and a memory comprising at least one secure zone, the electronic equipment being configured to interact with the computer file, and the memory comprising at least one reference access right to the electronic equipment,
   the computer medium operable with the electronic equipment so that, after connection of the computer medium to the electronic equipment, the electronic equipment:
   acquires a reference authenticator via the computer file,
   acquires an authenticator from the user,
   authenticates the user by comparing the authenticator from the user with the reference authenticator,
   acquires the access right via the computer file when the authentication module has authenticated the user, and
   opens an access session to said at least one corresponding secure zone, when the acquired access right corresponds to the reference access right comprised in the memory.

12. The medium according to claim 11, wherein the medium is a FLASH memory medium.

13. An electronic equipment, comprising:
   a processor; and
   a memory comprised of at least one secure zone, wherein the electronic equipment is configured to interact with a computer file, the computer file being specific to a user and stored on a non-transitory computer-readable data storage medium, the computer file comprising a reference authenticator and an access right to the electronic equipment for at least one corresponding secure zone, the memory comprising at least one reference access right to the electronic equipment, and the processor of the equipment configured to cause the equipment to:
  acquire a reference authenticator via the computer file after connection of the computer medium to the electronic equipment,
  acquire an authenticator from the user,
  authenticate the user by comparing the authenticator from the user with the reference authenticator,
  acquire the access right via the computer file when the authentication module has authenticated the user, and
  open an access session to said at least one corresponding secure zone, when the acquired access right corresponds to the reference access right comprised in the memory.

14. The electronic equipment according to claim 13, wherein the electronic equipment is a piece of railway equipment configured to be placed on board a railway vehicle or to be installed on the ground along a railway line.

15. The electronic equipment according to claim 14, wherein the electronic equipment is a motor, a display system, an air conditioning system, a piece of network equipment, a piece of security equipment, a piece of signaling equipment, a piece of railway control equipment, a light, a switch or a crossing.

* * * * *